United States Patent [19]

Walther et al.

[11] 4,100,509
[45] Jul. 11, 1978

[54] DYESTUFF LASER

[75] Inventors: Herbert Walther, Cologne; Wolfgang Hartig, Essen-Haarzopf; Adolf Friedrich; Roderich Raue, both of Leverkusen, all of Fed. Rep. of Germany

[73] Assignee: Bayer Aktiengesellschaft, Leverkusen, Fed. Rep. of Germany

[21] Appl. No.: 702,080

[22] Filed: Jul. 2, 1976

[30] Foreign Application Priority Data

Jul. 4, 1975 [DE] Fed. Rep. of Germany ....... 2529903

[51] Int. Cl.$^2$ ............................................... H01S 3/20
[52] U.S. Cl. ........................... 331/94.5 L; 252/301.17
[58] Field of Search ............. 331/94.5 L; 252/301.17, 252/301.18

[56] References Cited

U.S. PATENT DOCUMENTS 3,818,371  6/1974  Herz et al. ...................... 331/94.5 L

FOREIGN PATENT DOCUMENTS 2,421,607  11/1975  Fed. Rep. of Germany ... 331/94.5 L

OTHER PUBLICATIONS

Schaefer, "Organic Dyes in Laser Technology," Angew. Chem. internat. Edit., vol. 9, No. 1 (1970) pp. 21–23.

Primary Examiner—William D. Larkins
Attorney, Agent, or Firm—Plumley and Tyner

[57] ABSTRACT

A dye laser employing a solution of:

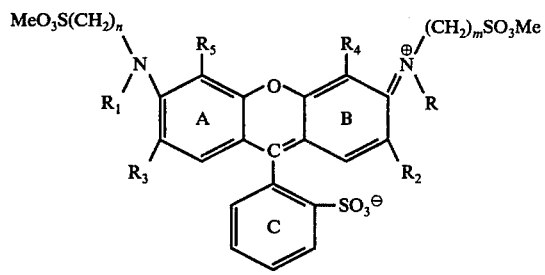

wherein
R and $R_1$ independently of one another represent hydrogen, alkyl, cycloalkyl or aralkyl or can form, with $R_2$ or $R_3$, or with $R_4$ or $R_5$, a partially hydrogenated 5-membered or 6-membered heterocyclic ring, $R_2$–$R_5$ independently of one another represent hydrogen, alkyl, alkoxy or halogen or can form, with R or $R_1$, a partially hydrogenated 5-membered or 6-membered heterocyclic ring,
Me represents hydrogen, a monovalent or divalent metal cation, or the ammonium, monoalkylammonium, dialkylammonium or trialkylammonium radical, and m and n denote a number between 1 and 4,
and wherein
the rings, A, B and C as well as the aliphatic or aromatic radicals present in the formula can also be substituted further, in a concentration which emits laser beams, preferably of $10^{-2}$ to $10^{-5}$ mol litre.

1 Claim, 2 Drawing Figures

DYESTUFF LASER

The subject of the invention is a process for generating coherent frequency-variable monochromatic radiation (laser light) by means of a dyestuff laser which consists of a reservoir for the dyestuff solution and an energy source, connected thereto, which is capable of exciting the dyestuff solution to emit, the radiation generated being in the wavelength range from 550 to 680 nm.

A laser is a light-amplifying device, by means of which it is possible to produce coherent monochromatic light in a high spectral and geometrical intensity density. The laser consists of an optical resonator which contains the fluid laser-active material in a thin-walled quartz cylinder. The cylinder is usually part of a closed system through which the dyestuff solution is caused to circulate, by pumping, whilst the laser is in operation. In this way, local overheating, which leads to optical inhomogeneities, is avoided.

The dyestuffs are excited with the aid of energy sources, by means of electrons or light, and the dyestuff laser can also be excited by a gas laser, for example a nitrogen laser or argon laser.

The excitation, also described as optical pumping, has the effect that electrons of the molecule of the laser dyestuff are raised from the ground state to a higher energy state, from which state a radiation transition takes place. If the number of molecules present in the excited state exceeds the number of molecules present in lower states, stimulated transitions occur, by means of which the light is amplified in the optical resonator.

If one of the laser mirrors partially transmits light, a part of the radiation issues from the apparatus in the form of a laser beam. On very effective excitation, dyestuffs which are particularly easy to excite show the phenomenon of "super-radiance". This can be observed, for example, if a quartz cell containing a solution of such dyestuff is placed in the beam of a nitrogen laser. Hereupon the solution emits laser light without the solution being placed between resonator mirrors.

A substantial advantage of the dyestuff laser over solid lasers or gas lasers is its ability to provide a frequency-variable laser beam. Because of the fluorescence band width of the dyestuffs employed, dyestuff lasers can be tuned, by inserting a frequency-selective element, for example a reflection grating or a prism, so that laser light is emitted at any desired wavelength within the total fluoresence band of the dyestuff.

Though a large number of suitable dyestuffs has already been proposed, there is nevertheless, in many regions of the visible wavelength range, still a considerable lack of compounds which give a very high efficiency of the laser.

Accordingly, the subject of the invention is a dyestuff laser consisting of a reservoir with a laser dyestuff solution contained therein and a pumping light source connected thereto, which source is capable of exciting the dyestuff solution to emit, characterised in that the dyestuff solution contains, in a solvent which does not interfere with the emission, a dyestuff of the general formula

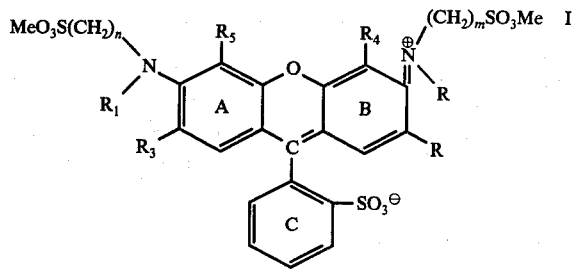

wherein

R and $R_1$ independently of one another represent hydrogen, alkyl, cycloalkyl or aralkyl or can form, with $R_2$ or $R_3$, or with $R_4$ or $R_5$, a partially hydrogenated 5-membered or 6-membered heterocyclic ring, $R_2 - R_5$ independently of one another represent hydrogen, alkyl, alkoxy or halogen or can form, with R or $R_1$, a partially hydrogenated 5-membered or 6-membered heterocyclic ring, Me represents hydrogen, a monovalent or divalent metal cation, or the ammonium, monoalkylammonium, dialkylammonium or trialkylammonium radical, and $m$ and $n$ denote a number between 1 and 4, and wherein the rings A, B and C as well as the aliphatic or aromatic radicals present in the formula can also be substituted further, in a concentration which emits laser beams, preferably of $10^{-2}$ to $10^{-5}$ mol/liter.

In the drawings

Figure 1:
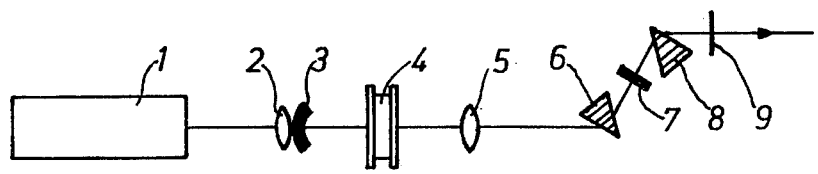
FIG. 1 is a schematic illustration of a dyestuff laser of this invention.

Possible alkyl radicals R or $R_1 - R_5$ are, in particular, those with 1 to 5 C atoms, which can contain further substituents, especially non-ionic substituents, such as halogen, especially chlorine and bromine; cyano; $C_1$-$C_4$-alkoxy, such as methoxy, ethoxy, n-propoxy and n-butoxy; di-$C_1$-$C_4$-alkylamino such as dimethylamino and diethylamino, and N-phenyl-N-$C_1$-$C_4$-alkylamino such as N-phenyl-N-methylamino; hydroxyl; cycloalkyl, such as cyclohexyl, and $C_1$-$C_4$-alkoxycarbonyl, such as methoxycarbonyl, ethoxycarbonyl, β-methoxyethoxycarbonyl, β-ethoxyethoxycarbonyl and n-butoxycarbonyl; N-$C_1$-$C_4$-alkylaminocarbonyl such as methylaminocarbonyl or ethylaminocarbonyl; di-$C_1$-$C_4$-aminocarbonyl such as dimethylaminocarbonyl or diethylaminocarbonyl; carbamoyl and thiocyanato.

Suitable cycloalkyl radicals R or $R_1$ are, preferably, the cyclohexyl or cyclopentyl radical.

As an aralkyl radical R or $R_1$, the benzyl radical should be mentioned preferentially.

Alkylene groups R or $R_1$, which are linked to the rings A or B via $R_{2-5}$, preferably contain two or three C chain members and can additionally be substituted, especially by methyl radicals.

Examples of such alkylene groups which may be mentioned are the ethylene and 1,3-propylene radical and the $-C(CH_3)_2-CH_2-CH(CH_3)-$ group.

Alkoxy radicals $R_2 - R_5$ preferably contain 1 to 4 C atoms; suitable halogen atoms $R_2 - R_5$ are, in particular, chlorine and bromine.

The following may be mentioned as examples of substituents in the rings A, B and C:

$C_1$-$C_5$-alkyl radicals, which can also be substituted further, such as methyl, trifluoromethyl, ethyl, β-cyanoethyl and tertiary butyl; 5-membered or 6-membered cycloalkyl radicals, such as cyclohexyl; phenyl-$C_1$-$C_3$-alkyl radicals, such as benzyl; halogen radicals, such as chlorine, bromine or fluorine, preferably chlorine; $C_1$-$C_5$-alkoxy radicals, such as methoxy, ethoxy, n-butoxy and isopropoxy; the phenoxy radical; $C_1$-$C_5$-alkylsulphonyl radicals, such as methylsulphonyl, ethylsulphonyl, n-butylsulphonyl and β-hydroxyethylsulphonyl; the benzylsulphonyl radical and the phenylsulphonyl radical; the carbamoyl or sulphamoyl radical, which can also optionally be substituted by one or two $C_1$-$C_4$-alkyl radicals which can together with the shared N atom, form a heterocyclic 5-membered or 6-membered ring, such as, for example, $CONH_2$, $SO_2NH_2$, dimethylamino-carbonyl or -sulphonyl, diethylaminocarbonyl or -sulphonyl, N-piperidino-carbonyl or -sulphonyl, N-morpholino-carbonyl or -sulphonyl, N-pyrrolidino-carbonyl or -sulphonyl, n-butylamino-carbonyl or -sulphonyl, n-butylamino-carbonyl or -sulphonyl and β-hydroxyethylamino-carbonyl or -sulphonyl; the cyano radical; the sulpho radical.

Possible cations Me are monovalent and divalent metals such as sodium, potassium, lithium, magnesium, calcium, barium, manganese and zinc.

Suitable monoalkylammonium, dialkylammonium and trialkylammonium salts are obtained by reacting the dyestuff-acid with monomethylamine, dimethylamine and trimethylamine, monoethylamine, diethylamine, and triethylamine, monoethanolamine, diethanolamine and triethanolamine, methyldiethanolamine, ethyldiethanolamine, dimethylethanolamine, diethylethanolamine, monoisopropanolamine, diisopropanolamine and triisopropanolamine, methyldiisopropanolamine, ethyldiisopropanolamine, dimethylisopropanolamine, diethylisopropanolamine, n-butylamine, sec. butylamine, dibutylamine and diisobutylamine.

Preferred laser dyestuffs of the formula I are those in which $n = 2$. Laser dyestuffs which, in turn, are preferred amongst these correspond to the formula:

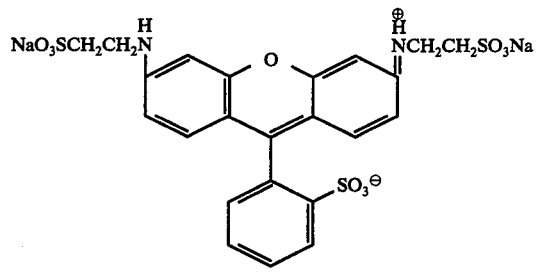

wherein
  $R_6$ and $R_7$ represent hydrogen, alkyl radicals with 1–4 C atoms or the benzyl radical,
  $R_8$ and $R_9$ denote hydrogen or alkyl radicals with 1–2 C atoms and
  Me represents hydrogen, potassium, sodium, ammonium, monoalkylammonium, dialkylammonium or trialkylammonium ions, with alkyl denoting $C_1$–$C_4$.

Examples of solvents which can be used according to the invention and which do not hinder the stimulated emission are water, monohydric and polyhydric alcohols, for example methanol, ethanol, isopropanol, butanol, ethylene glycol and glycol monoethyl ether, cyclic ethers, such as tetrahydrofurane and dioxane, aromatic compounds, such as benzene, toluene, phenol, resorcinol and cresols, and also cyclohexane, decalin, chloroform, dimethylsulphoxide, ketones, such as acetone, 2-butanone and cyclohexanone, esters, such as ethyl acetate, diethyl malonate, glycol diacetate and diethyl carbonate, and fluorinated alcohols, for example hexafluoroisopropanol.

Laser light from frequency-variable lasers has in recent years attained considerable importance in spectroscopy. The lasers can be employed for analytical purposes; high resolution spectroscopy, fluorescence spectroscopy, absorption spectroscopy, life measurements and photoionisation, and in the spectroscopy of negative ions.

They are furthermore of great technical importance in information technology, in protection of the environment and in isotope separation.

A number of the dyestuffs show, as a particular advantage, the effect of "super-radiance" described on page 3.

EXAMPLE 1:

The dyestuff of the formula

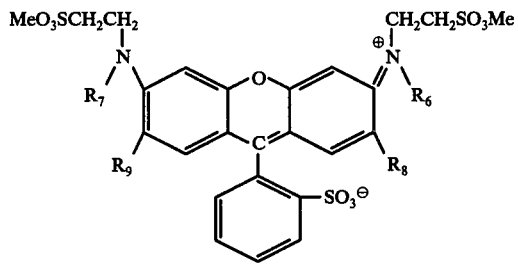

was examined, in the continuous dyestuff laser of Hercher and Pike [(M. Hercher and H. A. Pike, Opt. Comm. 3, 65 (1971)] for dependence of the laser emission on the wavelength. With reference to FIG. 1, the dyestuff laser consists of an argon laser 1, a focus lens 2, a laser resonator, an external prism 8 and an argon filter 9.

The laser resonator consists of a spherical mirror 3 and the plane mirror 7; the resonator length was 20 cm. The dyestuff solution, which circulated through the dyestuff cell 4 at a flow speed of 15 m/second, was excited with line 5145 Å of an argon ion laser 1. For this purpose, the pumping light was focussed into the cell 4 by means of the lens 2. The lens 5 serves to match the mode volume of the resonator to the optically pumped dyestuff volume.

A rough wavelength selection was made by means of the dispersion of a prism 6 which was placed in the beam of the Brewster angle.

The laser was tuned by rotating this prism. The line width of the spectral distribution of the laser was about 1 Å. A further narrowing of the line width in the range of the Mc/s order of magnitude (about $10^{-5}$ Å) is possible without problems.

The second external prism (8) served to turn the laser beam into the horizontal.

To carry out the measurement, the laser beam was divided into two beams in the ratio 1:1 by means of a beam-splitting system. With one beam, the wavelength of the laser emission was examined using a monochromator, and with the second beam the output capacity was measured with the aid of a bolometer.

Doubly distilled water was used as the solvent for the dyestuff investigated. The concentration was 1 or 2 × $10^{-4}$ mol/liter, 3% of a cationic surface-active substance being added. The criterion of the correct concentration was minimum pumping output at the laser threshold.

Figure 2:
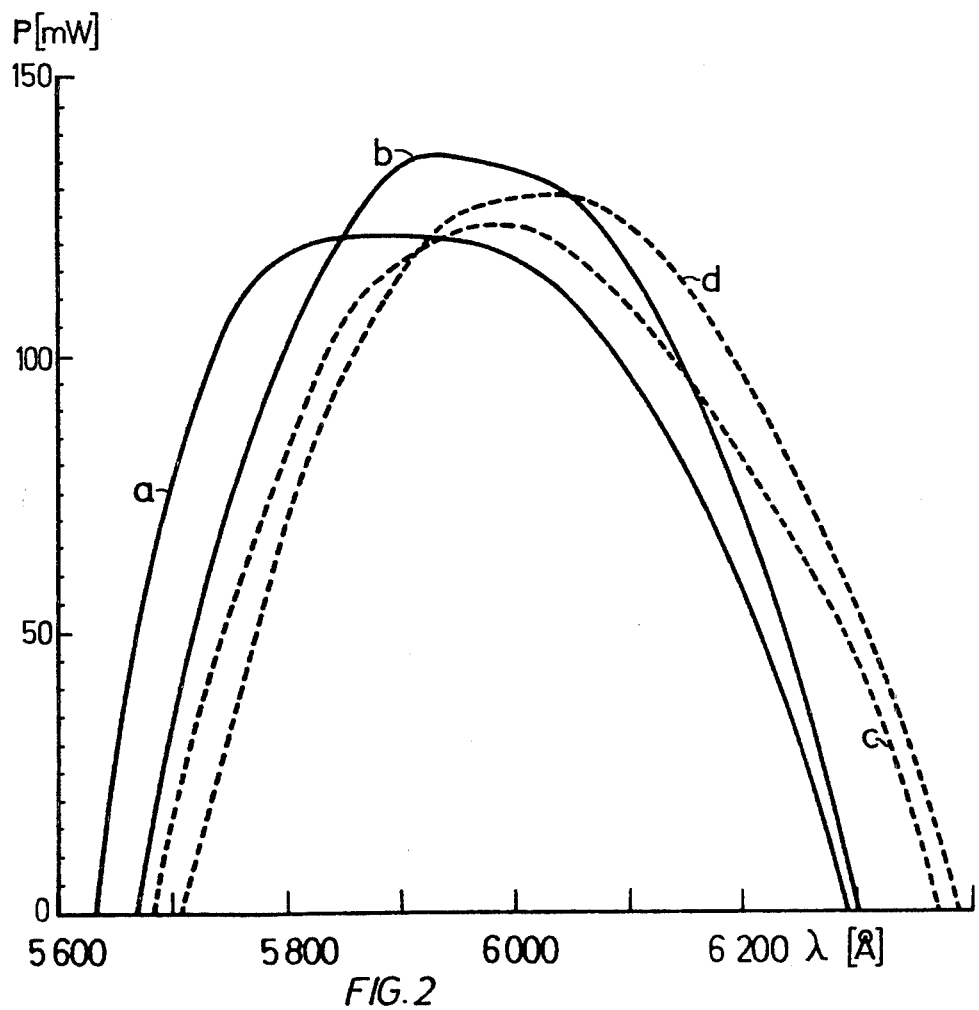
FIG. 2 is a graphical relationship of the output of the laser at various wavelengths for different concentrations of dyestuffs.

The measurements were carried out with a pumping output of the argon ion laser of 1.5 watt, that is to say about 1 watt above the laser threshold. The results are shown in FIG. 2.

| | | |
|---|---|---|
| a: Dyestuff according to example 1 | $1 . 10^{-4}$ molar | |
| b: Dyestuff according to example 1 | $2 . 10^{-4}$ molar | |
| c: Rhodamine 6 G | $1 . 10^{-4}$ molar | |
| d: Rhodamine 6 G | $2 . 10^{-4}$ molar | |

Compared with the known laser dyestuff Rhodamine 6G, the laser dyestuff used according to the invention surprisingly shows a substantially higher output. The range of laser excitation has unexpectedly been shifted markedly towards shorter wavelengths.

The laser dyestuff used was prepared as follows:

1,526 g of a 21.2% strength aqueous taurine solution are added dropwise at room temperature to 810 g of 3,6-dichloro-9-phenyl-xanthylium-2'-sulphonate in 1,000 g of water, in such a way that a pH value of 8.5 is not exceeded. The mixture is then stirred for a further 10 hours at room temperature, after which it is heated to the boil, and 1,387 g of the taurine solution are added dropwise over the course of 1-2 hours in such a way that the reaction mixture has a constant pH value of 7. The mixture is stirred for a further 5 hours under reflux. The dyestuff is precipitated from the clear dark red solution by adding sodium chloride. It is dried in vacuo at 50° – 60° C. Yield: 932 to 938 g.

EXAMPLE 2:

The dyestuff of the formula

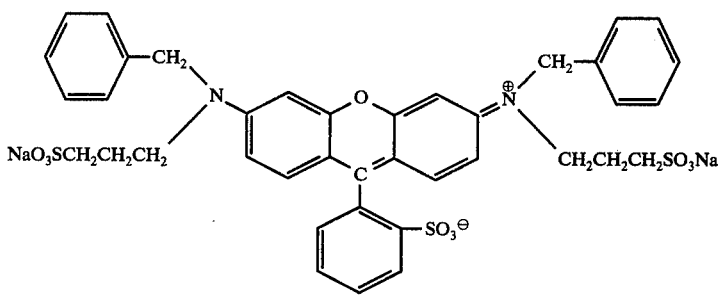

was investigated for dependence of the laser emission on the wavelength, in the apparatus described in Example 1. The concentration of the dyestuff was $4 . 10^{-4}$ mol/liter and the pumping output of the argon ion laser was the same as in Example 1.

Compared to the known laser dyestuff Rhodamine 6G, the laser dyestuff used according to the invention shows a maximum displaced towards longer wavelengths. The breadth of action of the dyestuff laser has been broadened in a highly desirable manner.

The dyestuffs in the table which follows can be used as laser dyestuffs in the same way.

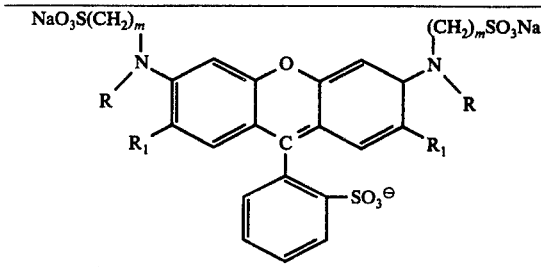

| Example | R | $R_1$ | m |
|---|---|---|---|
| 3 | $C_2H_5$ | H | 2 |
| 4 | $C_4H_9$ | H | 2 |
| 5 | $C_2H_5$ | H | 3 |
| 6 | $C_2H_4CN$ | H | 2 |
| 7 | $C_2H_4Cl$ | H | 2 |
| 8 | $C_2H_4OCH_3$ | H | 2 |
| 9 | $C_2H_4OC_2H_5$ | H | 2 |
| 10 | $C_2H_4C_6H_5$ | H | 2 |
| 11 | $C_2H_4OH$ | H | 2 |
| 12 | H | $CH_3$ | 2 |
| 13 | H | $CH_3$ | 3 |
| 14 | $CH_2CHOH$ | H | 2 |
| 15 | $C_6H_{11}$ | H | 2 |
| 16 | H | $OCH_3$ | 2 |
| 17 | H | $OC_2H_5$ | 2 |
| 18 | H | Cl | 2 |
| 19 | $CH_3$ | H | 2 |

We claim:

1. Dyestuff laser comprising a reservoir with a laser dyestuff solution contained therein and a pumping light source connected thereto, which source is capable of exciting the dyestuff solution to emit, characterised in that the dyestuff solution contains, in a solvent which does not interfere with the emission, a dyestuff of the general formula

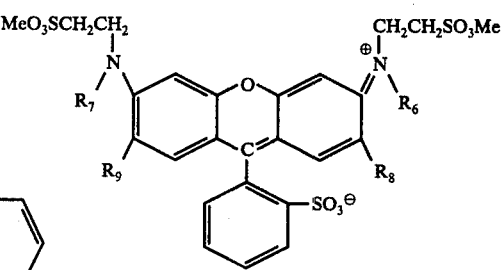

wherein $R_6$ and $R_7$ represent hydrogen, $R_8$ and $R_9$ denote hydrogen or alkyl radicals with 1-2 C atoms and Me represents hydrogen, potassium, sodium, ammonium, monoalkylammonium, dialkylammonium or trialkylammonium ions, with alkyl denoting $C_1$-$C_4$, in a concentration which emits laser beams, preferably of $10^{-2}$ to $10^{-5}$ mol/liter.